June 25, 1935. O. A. PARKER 2,005,828
WHEEL
Filed Nov. 4, 1931 2 Sheets-Sheet 2
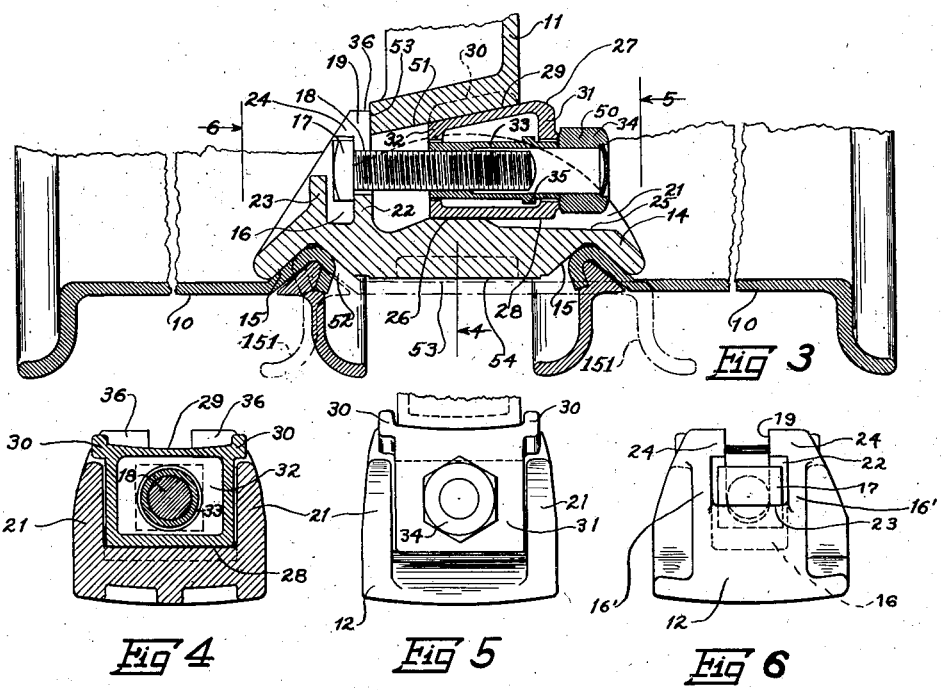
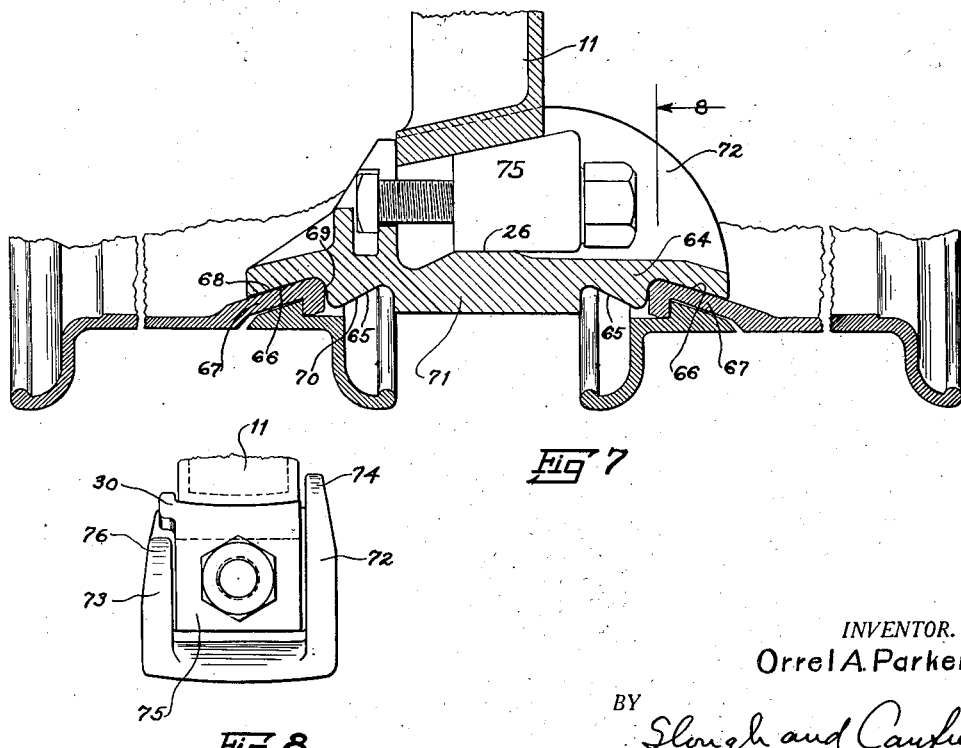
INVENTOR.
Orrel A. Parker
BY Slough and Caufield
ATTORNEY.

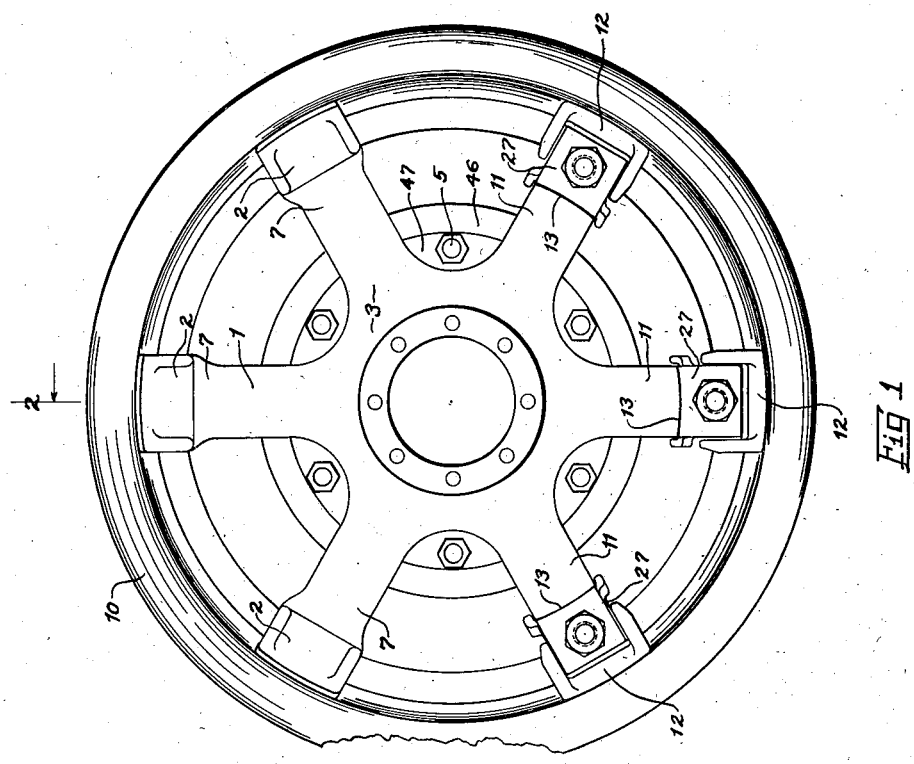
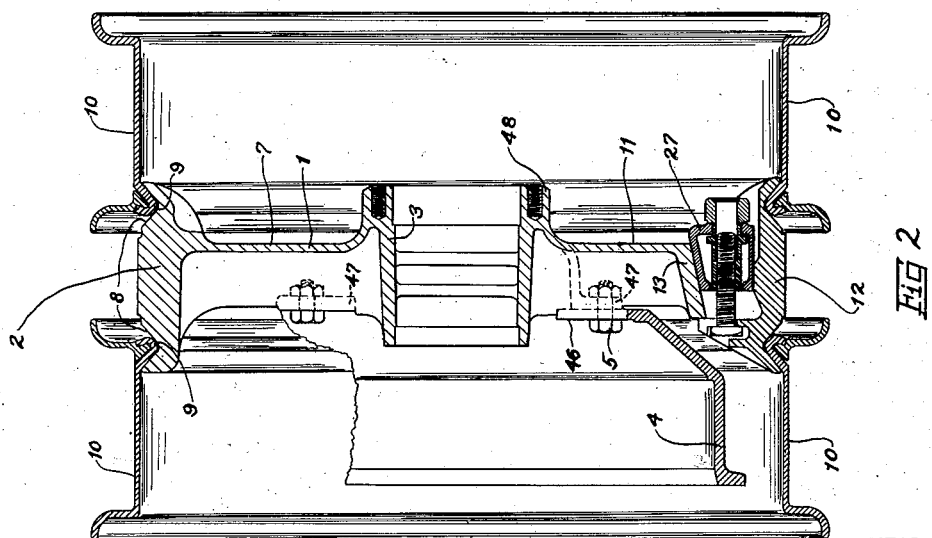

Patented June 25, 1935

2,005,828

UNITED STATES PATENT OFFICE 2,005,828

WHEEL

Orrel A. Parker, Cleveland, Ohio

Application November 4, 1931, Serial No. 572,945

7 Claims. (Cl. 301—12)

This invention relates to wheels for automobiles, buses, trucks and the like, and more particularly to wheels carrying dual tires, that is, two tires arranged side by side for the purpose of jointly carrying the load.

One of the objects of the invention is to provide an improved wheel body upon which dual demountable tire-carrying rims can be easily and quickly mounted and from which they may be easily and quickly demounted.

Another object is to provide an improved wheel body with which dual rims may be used and an improved fastening means for fastening the rims on the wheel body.

Another object is to provide an improved wheel body and fastening means for dual rims wherein, by means of a single operative mechanism, the securing of or the attachment of both rims to the wheel body may be concurrently effected and in an improved manner.

Another object is to provide, in connection with a wheel body and dual tire rims therefor, an improved fastening device for forceably clamping the rims to the wheel body, and adapted to exert substantially equal force upon both rims concurrently when the device is operated.

Another object is to provide, for wheels of the demountable rim type, an improved fastening means for fastening the rim on the wheel.

Another object is to provide an improved wheel body and rim fastening means, whereby dual tire rims may be secured upon the body; and the body and fastening means being furthermore adapted to the optional employment of a single rim.

Another object is to provide a wheel body and fastening means for fastening dual rims thereon; and the body and fastening means being adapted to the optional employment of rims of different dimensional characteristics.

Other objects will be apparent to those skilled in the art to which my invention appertains.

My invention is fully disclosed in the following description taken in connection with the accompanying drawings, in which:

Fig. 1 is a front elevational view of an embodiment of my invention;

Fig. 2 is a cross-sectional view taken approximately from the plane 2 of Fig. 1;

Fig. 3 is a fragmentary view illustrating to an enlarged scale a part of Fig. 2 and showing a fastening device which I may employ;

Fig. 4 is a sectional view taken from the plane 4 of Fig. 3;

Fig. 5 is an elevational view taken from the plane 5 of Fig. 3;

Fig. 6 is an elevational view taken from the plane 6 of Fig. 3;

Fig. 7 is a view similar to Fig. 3 showing a modification; and

Fig. 8 is a view taken from the plane 8 of Fig. 7.

Referring to the drawings, I have shown at 1, generally, the wheel body proper. The body 1 may be variously formed but in the illustrated embodiment thereof comprises a plurality, such as six, spokes radiating from a central hub 3, said spokes being of two kinds, those shown at 7 terminating in integral rim-supporting enlarged ends 2, and those shown at 11 being shorter and supporting removable shoes 12 herein later more specifically described.

A brake drum 4 may be secured to the body as by bolts 5—5, projected through holes in the flange 46 of the drum and webs 47 between the spokes.

The hub 3 may have a tapered bore and key and keyway, or splines, not shown for securing it to the driving element of a vehicle rear axle, or it may have bearings and a driving flange 48 of well known construction, for drivingly connecting it to the rear axle. The parts just described constitute no essential part of my invention and are well known, and may be variously formed and modified, and are not deemed necessary of further illustration or description.

At least a part of the whole number of spokes, such for example, as half of them, each indicated in the drawings, by the reference character 7, have formed in their outer ends parallel grooves 8—8 concentric with the axis of the wheel and of suitable size, cross-sectional shape, and curvature, to serve as tapered seats for corresponding internal beads 9—9 on a pair of dual rims 10—10. The grooves 8—8 are suitably spaced apart axially of the wheel to correspondingly suitably space the rims 10—10.

In assembling the rims 10 with the wheel body 1, in a manner to be more fully described later in connection with an attachment device which I employ, the rims 10 are first placed with the beads 9 in the grooves 8 and with the spokes 7 at, or substantially at, the top of the wheel, so that the rims 10 are suspended from above and by gravity. The beads 9 are retained in the grooves 8 so that the attention of the user or operator may be devoted to securing the rims on the wheel body by the means now to be described.

The spokes 11—11 are radially shorter than the spokes 7, and the rims 10 which have been placed with their beads 9 in the grooves 8 and thus suspended from the upper spokes 7, may be swung axially inward under the ends of the spokes 11, the latter terminating approximately at 13—13.

The shoes 12 are then operated to rigidly connect the rims 10 with the spokes 11—11, and the construction and mode of operation is such that the devices 12 exert a radially outward thrust on the rims 10 which clamps the rims 10 on all of the spokes 7 and 11.

Each of the shoes 12 are provided with inwardly extending radially disposed, side walls 21—21 and a rear wall 22. The rear wall has a vertical slot 19 through which the shank of a bolt 18 may be inserted. The underside of the head 17 of the bolt thus engages the wall 22 whereby tension may be put on the bolt. The bolt is trapped in the wall 22 in a pocket 16, an inboard wall 23 of the pocket limiting axial movement of the bolt head inboardly by overlapping the lower part of the bolt head and the wall 22 limiting outboard axial movement; the bolt head is restrained from moving radially inwardly by overhanging side wall portions 24—24 which overhang the bolt head from both sides.

The bolt head 17 is also trapped against rotational movement by fitting rather loosely between the end walls 16' of the pocket 16, as shown in Fig. 6.

In order to assemble the bolts with the head 17 in the pocket 16, one edge of the bolt head is first inserted in the space between the wall 23 and the overhanging portion 24, and then the shank of the bolt is rocked around through the slot 19, finally taking up the position shown in Fig. 3, from which position it is trapped, as above described, against removal either axially or radially.

The shoe 12 is so formed as to provide a floor 25 disposed between the walls 21, whose radially inward surface provides a transverse ridge.

Engageable with the ridge 26 is a wedge 27 provided with a lower face 28 adapted to engage the ridge 26, an upper camming face 29, and a pair of spaced ears 30—30.

The wedge 27 is hollow, having end walls 31 and 32, provided with suitable perforations in which is rotatably mounted the shank 33 of a sleeve nut 50 threaded on the bolt 18. With the parts in their normal positions, the axis of the bolt 18 is horizontally disposed and substantially parallel to the surface 28 of the wedging element 27, and the wedging surface 29 is disposed at an angle preferably of about 12 degrees with the surface 28, all as viewed in Fig. 3.

The sleeve nut 50 has a head 34 overlapping the end wall 31 on the outside thereof and the inside of the wall 31 is overlapped by a collar 35 on the shank 33 of the sleeve nut. Thus the sleeve nut 50 is trapped in the wedging element 27 so as to limit axial movement therein but is rotatable therein. In this manner the bolt 18 and the sleeve nut 50 operate in a substantially straight line at all times.

The shank 33 is internally threaded for a portion of its length at the end opposite the head 34 to mesh with the bolt 18, and when the head 34 of the nut is turned, the nut is therefore propelled along the bolt 18, the latter being trapped so as to limit longitudinal or axial movement and also rotational movement by its head in the pocket 16, and propelling movement is transmitted to the wedge 27.

The outboard opening of the sleeve nut 50 is closed by a disk plug or in any convenient manner, so that a suitable lubricant may be retained in the hollow chamber inside the sleeve nut 50 and between the plug and the position ordinarily taken by the threaded end of the bolt 18. This lubricant, retained for long periods, keeps the threads in good condition and very greatly increases the ease of operation of the device.

The radially outward ends or end surfaces 51 of the short spokes 11—11 substantially conform to the surface 29 of the wedging element and these conforming surfaces may be planes, or portions of cone; and the ears 30 are spaced suitably to embrace the sides of the spoke ends.

The shoes 12 are coextensive, axially of the wheel, with the radially outward end portions of the spokes 7—7 and on their radially outwardly disposed portions are provided each with a pair of grooves 15—15 circular with respect to the wheel axis and curvilinearly aligned with and of approximately the same cross-sectional shape as the grooves 8—8 on the spokes 7—7.

In the preferred mode of operation of my invention, after the rims 10 have been suspended from the upper spokes 7, as above referred to, the shoe assembly or device 12 is laid upon the rims 10—10, the grooves 15 resting on the rim beads 9. The shoe is preferably laid on the rims at a point between two adjacent spokes, and is then moved circumferentially along the beads 9 until it comes opposite the end of a spoke 11.

While this is being done, the nut 50 is unscrewed sufficiently to position the wedge 27 sufficiently far away from the head end of the bolt to enable the ears 30—30 to pass radially under the ends of the spokes 11, or, to pass beyond the outboard face portions of the spoke ends.

The nut 50 is then turned in the direction to move the wedge 27 toward the head of the bolt, causing the ears 30 to embrace the sides of the ends of the spoke 11 and causing the wedging surface 29 to engage the surface 51 at the end of the spoke 11.

Continued rotation of the nut 50 will effect a wedging engagement between the surface 29 and the spoke ends, and will thrust the entire shoe assembly including the grooves 15—15 thereof, outwardly radially and rigidly clamp or wedge the device between the ends of the spokes 11 and the rims 10.

The rear wall 22 of the shoe 12 has upstanding hook portions 36—36 engaging the axially inboard portion 53 of the spoke 11 and thus serve as reaction points for the shoe 12, whereby the above described wedging action may be effected.

It will be understood that the wedging action tends to move the entire device and particularly shoe 12 outwardly radially and thus causes a radial reaction between the ends of the spokes 11 and the rims 10 to rigidly clamp them on the spokes.

The wedging force between the ends of the spokes 11 and the floor 25 of the shoe 12 is transmitted through the ridge 26, whereby the shoe 12 may have a slight rocking movement to equalize the force transmitted through the grooves 15 to both of the rims to clamp the rims with equal force. It is obvious that the ridge 26 can be so located as to give unequal force on the rims in case this is desirable. In all cases, however, the force exerted on the rims will be inversely commensurable to the relative distances between the intermediate ridge 26 and the respective grooves 15.

In this connection, the surface or ridge 26 may be slightly rounded if desired to facilitate the rocking and equalizing movement.

The shoe devices 12 may be loosened and removed in the reverse of the above described operation to remove the rims from the wheel body 1.

When this is done, rotation of the sleeve nut 50 causes the head 17 of the bolt 18 to move axially inwardly sufficient to engage the wall 23, after which continued rotation causes great pressure necessary to loosen the wedging element 27 to be exerted, so that the wedge is extracted by the wrench effected rotation and no pounding or prying is necessary.

As will now be apparent from the foregoing description, my invention has particular advantages when applied to the fastening of dual rims upon a wheel, among which advantages are the equalizing rocking movement of the shoe 12 to equalize the radially outward thrust of the shoe upon the two rims 10—10. But many of the advantages of my invention may be enjoyed in connection with wheels of the single rim type.

In Fig. 3, in broken lines, at 151 I have indicated a single rim having a bead portion 52. The bead portion 52 may be lodged in one of the two grooves 8 of the spokes 7—7 and may be engaged by one of the grooves 15 of the shoe 12, as shown in Fig. 3. A main body portion 53 of the rim, shown also in broken lines, may engage a corresponding surface or radially outward projecting face 54 of the shoe 12. Such a rim 151, when the shoes 12 are thrust radially outward by the mode of operation hereinabove described, will be rigidly and securely fastened to the wheel in a manner that will now be clear, the bead 52 being engaged by the groove 15 and the body portion 53 of the face 54.

In some instances, single rims such as the rim 151, may be of such axial width that when the bead 52 is lodged in the groove 15, the central rotational plane of the rim or of the tire thereon may be disposed at one side or the other axially considered of the spokes of the wheel. It is sometimes desirable to be able to selectively dispose the rotational plane of the tire coincident with the central plane of the spokes, or to dispose it axially inwardly or outwardly thereof; and this selection may be had in the employment of my invention by a suitable selection of rim width, for a given spacing of grooves 15 and grooves 8; or for a given rim, the bead 52 may be placed in the outboard grooves 8 and 15 and the center line of the rim with regard to the wheel may be thus moved axially.

In Figs. 7 and 8 I have shown a modification of my invention. In this form the shoe 64, corresponding to the shoe 12 of the other form, is of greater extent axially of the wheel, and is provided with two sets of grooves 65—65, relatively close together, and grooves 66—66 disposed respectively outwardly of the grooves 65. Furthermore, the grooves 65 and 66 have a different cross-sectional configuration from the grooves 15 of the other form. The grooves 15 of the above described form are preferably symmetrical, each side of the groove being inclined at the same angle, a feature which becomes desirable when contemplating optionally employing two rims or one rim, as above referred to.

The grooves 65 and 66 illustrate the preferred shape of the groove when dual rims only are to be employed in each case.

The bead 67 illustrates one standardized commercial shape of bead, and correspondingly the groove 66 has a relatively flatly inclined bottom 68, and a relatively abrupt shoulder 69. The groove 65 has a bottom portion 70 more steeply inclined to correspond to another commercial bead.

Thus the shoe 64 is particularly adapted to a plurality of commercial standardized forms of bead, and, as will be obvious, the shoe 64 may be formed, as well as the grooves thereof, to fit various commercial forms.

By providing more than one pair of grooves in the shoe 64, the axial length of the shoe is thereby increased, and inasmuch as the outward radial thrust of the wedge device 27 is applied upon the ridge 26 at a point between engaged grooves in the shoe, the farther apart the pair of grooves, such as the grooves 66, the more must the floor or base 71 of the shoe be reenforced against breaking by the side wall thereof, corresponding to the wall 21 of the first described form.

To provide this greater resistance to breaking, one of the side walls 72 of the form under consideration is made of great radial depth, being extended as shown at 74 inwardly radially beyond the end of the adjacent spoke 11. The opposite side wall 73, however, is made substantially of the same depth as the wall 21 of the first described form. In correspondence with the wall 72 overlapping the end of the spoke 11, only one ear 30 is employed on the wedge element 75 corresponding to the wedge element 27 of the other form, and the wall 73 is made only as high or deep as will permit the ear 30 to clear the inward radial termination 76 of the wall 73.

In the operation of the form of Figs. 7 and 8, to clamp the rims upon the spokes, the procedure is the same as that in the first described form, except that in the latter, the wedge 27 and the rest of the shoe 12 may be, after laying the grooves of the shoe on the beads of the rims, moved circumferentially in either direction to bring it under the end of the adjacent spoke 11, whereas with the form of Figs. 7 and 8, due to the overlapping side wall 72, this movement can take place circumferentially only from one direction with the parts disposed as viewed in Fig. 8. In other words, by providing a side wall 73 and an ear 30 on one side of the device disposed so as to be movable under the end of the spoke 11, to position the device for exerting its clamping function, the opposite wall 72 may be extended inwardly radially as at 74 as far as may be necessary to provide the necessary strength, above referred to, in the shoe 64.

While I have illustrated and described a wheel body of the type having spokes, it will be understood that many, if not all, of the elements of my invention may be practiced with bodies generally of the disc type.

Otherwise, also, my invention is not limited to the exact details of construction shown and described since many modifications and changes may be made within the scope and spirit of my invention.

I claim:

1. In a wheel structure, a main body comprising a spoke portion, a pair of demountable rims on the body, means for exerting thrust radially outwardly on the rims to clamp them on the body, the means comprising a device having a frame element engaging the rims radially inwardly thereof, and disposed between the end of the spoke portion and the rims, a wedge element movable axially on the frame element, and engaging the end of the spoke portion, a bolt loosely anchored at its head end in the frame element, and extending through the wedge element, a nut on the bolt engaging the wedge element to propel the element axially of the bolt in either direction, and adapted when turned in one direction on the bolt to propel the wedge element axially on the frame element in one direction to cause it to react wedgingly between the end of the spoke portion and the rims, the frame element having a portion extending radially of the wheel and overlapping the end of the spoke portion to prevent axial movement of the frame element in the other direction, and the frame element rockingly engaging the wedge element whereby the wedging force may be equalized between the frame element and the two rims.

2. In a wheel structure, a main body comprising a spoke portion, a pair of demountable rims on the body, means for exerting thrust radially outwardly on the rims to clamp them on the body, the means comprising a device having a frame element engaging the rims radially inwardly thereof, and disposed between the end of the spoke portion and the rims, a wedge element movable axially on the frame element, and engaging the end of the spoke portion, a bolt loosely anchored at its head end in the frame element, and extending through the wedge element, a nut on the bolt engaging the wedge element to propel the element axially of the bolt in either direction, and adapted when turned in one direction on the bolt to propel the wedge element axially on the frame element in one direction to cause it to react wedgingly between the end of the spoke portion and the rims, the frame element having a portion extending inwardly radially and overlapping the end of the spoke portion to prevent axial movement of the frame element in the other direction, and the frame element rockingly engaging the wedge element whereby the wedging force may be equalized between the frame element and the two rims, and guiding portions on the wedge element embracing the sides of the spoke element adjacent its end.

3. The combination with a demountable type tire rim, of a wheel body for supporting the rim, the rim having an inwardly radially projecting annular bead portion fitting directly on an integral circumferential portion of said body, other circumferential portions of the body being sufficiently relieved to permit the dismounting and mounting of the rim thereover, and a detachable operable unitary wedging device comprising a frame element having a segmental circular groove, the frame element being adapted to be laid on the rim at a point between two adjacent relieved portions of said body with the circular groove meshed with the annular bead portion, the meshed bead portion and groove serving as arcuate concentric guides for the frame element upon which it may be circumferentially slidably moved into a position between the rim and a relieved portion of the wheel body, and the frame element having a portion extending generally inwardly radially which, when the frame is in said position, overlaps a portion of the said relieved portion of the wheel body, and the detachable device comprising a wedge element and a screw-threaded means having a thread axis in the general direction of the wheel axis, assemblable with the wedge element in the frame, and the screw-threaded means being operable to cause the wedge element to exert radial thrust between the frame element and the relieved portion and to cause the wedge element and said overlapping portion of the frame to exert balanced axial thrusts on the relieved portion, to first effect gripping of the frame element with the engaged bead portion to prevent circumferential shifting of the device and upon increase of thrust to outwardly radially tension the rim.

4. The combination with a pair of demountable type tire rims of a wheel body for supporting the rims, said rims having inwardly radially projecting annular bead portions fitting directly on an integral circumferential portion of said body, other circumferential portions of the body being sufficiently relieved to permit the mounting and dismounting of a remotely disposed inboard rim thereover, and a detachable unitary operable wedging device comprising a frame element having a pair of segmental circular grooves, the frame element being adapted to be laid on the rims at a point between two adjacent relieved portions of the wheel body and with the circular grooves meshed with the annular bead portions, the meshed bead portions and grooves serving as arcuate concentric guides for the frame element upon which it may be circumferentially slidably moved into a position between the rims and a relieved portion of the wheel body, and the frame element having a portion extending generally inwardly radially which, when the frame is in said position overlaps a portion of the said relieved portion of the wheel body, and the detachable device comprising a wedging element and a screw-threaded means having a thread axis generally in the direction of the wheel axis, assemblable with the wedge element in the frame and the screw-threaded means being operable to cause the wedge element to move to exert radial thrust between the relieved portion and the frame element and to cause the wedge element and said overlapping portion of the frame to exert balanced axial thrusts on the relieved portion, to first effect a gripping of the frame element with the engaged bead portions to prevent circumferential shifting of the device, and, upon increase of thrust, to outwardly radially tension the rims.

5. The combination described in claim 4 and in which the device frame element in engagement with the bead portions of both rims slidingly and rockingly engages the wedge element on a restricted portion of the frame element intermediate the bead engaging portion of the frame element to equalize the wedging force upon the two rims.

6. In a wheel structure, a main body comprising a spoke portion, a demountable rim on the body, means for exerting thrust radially outwardly on the rim to clamp it on the body, the means comprising a device having a frame element engaging the rim radially inwardly thereof and disposed between the end of the spoke portion and the rim, a wedge element movable axially on the frame element and engaging the end of the spoke portion, a bolt anchored at one end in the frame element and extending through the wedge element, a nut on the bolt engaging the wedge element to propel the element axially of the bolt in either direction, and adapted when turned in one direction on the bolt to propel the wedge element axially on the frame element in one direction to cause it to react wedgingly between the end of the spoke portion and the rim, the frame element having a portion extending radially of the wheel and overlapping the end of the spoke portion to prevent axial movement of the frame element in the other direction.

7. In a wheel structure, a main body comprising a spoke portion, a demountable rim on the body, means for exerting thrust radially outwardly on the rim to clamp it on the body, the means comprising a device having a frame element engaging the rim radially inwardly thereof and disposed between the end of the spoke portion and the rim, a wedge element movable axially on the frame element and engaging the end of the spoke portion, a bolt anchored at one end in the frame element and extending through the wedge element, a nut on the bolt engaging the wedge element to propel the element axially of the bolt in either direction, and adapted when turned in one direction on the bolt to propel the wedge element axially on the frame element in one direction to cause it to react wedgingly between the end of the spoke portion and the rim, the frame element having a portion extending inwardly and overlapping the end of the spoke portion to prevent axial movement of the frame element in the other direction, and guiding portions on the wedge element embracing the sides of the spoke element adjacent its end.

ORREL A. PARKER.